(12) United States Patent
Amaddeo et al.

(10) Patent No.: US 6,516,847 B1
(45) Date of Patent: Feb. 11, 2003

(54) LOW ROLLING RESISTANCE TIRE FOR VEHICLES HAVING A COMPOSITE TREAD

(75) Inventors: Angela Amaddeo, Arienzo (IT); Mario Isola, Milan (IT); Antonio Serra, Genoa (IT)

(73) Assignee: Pirelli Pneumatici S.p.A., Milan (IT)

( * ) Notice: Subject to any disclaimer, the term of this patent is extended or adjusted under 35 U.S.C. 154(b) by 208 days.

(21) Appl. No.: 09/697,175

(22) Filed: Oct. 27, 2000

Related U.S. Application Data
(60) Provisional application No. 60/162,119, filed on Oct. 29, 1999.

(30) Foreign Application Priority Data

Oct. 28, 1999 (EP) .............................................. 99203558

(51) Int. Cl.⁷ ........................... B60C 9/18; B60C 11/00; B29D 30/52; B29D 30/54
(52) U.S. Cl. ....................... 152/209.5; 152/532; 156/96; 156/123; 156/128.1; 156/130; 428/411.1
(58) Field of Search ............................. 152/209.5, 532; 156/96, 130, 128.1, 123; 428/411.1

(56) References Cited

U.S. PATENT DOCUMENTS

| 4,319,619 A | 3/1982 | Kozima et al. |
| 4,381,810 A | 5/1983 | Cady et al. |
| 6,340,041 B1 * | 1/2002 | Sugihara et al. ......... 152/209.5 |

FOREIGN PATENT DOCUMENTS

| DE | 36 37 825 A1 | 5/1987 |
| EP | 0 604 108 A1 | 6/1994 |
| EP | 0 691 218 A2 | 1/1996 |
| EP | 0 715 974 A1 | 6/1996 |
| GB | 2 057 369 A | 4/1981 |
| GB | 2 150 509 A | 7/1985 |

OTHER PUBLICATIONS

Makoto, M., "Radial Tire For Passenger Vehicle", Patent Abstracts of Japan, vol. 009, No. 198 (M–404), of JP 60061312, Apr. 9, 1985, The Yokohama Rubber Co. Ltd.

* cited by examiner

*Primary Examiner*—Adrienne C. Johnstone
(74) *Attorney, Agent, or Firm*—Finnegan, Henderson, Farabow, Garrett, & Dunner, L.L.P.

(57) ABSTRACT

A low rolling resistance tire (1) for vehicles is described which comprises at least one belt layer (7) coaxially extending around at least one carcass ply (3), a composite tread (10) coaxially extending around the belt layer (7) and comprising a radially outer layer (12) and a radially inner layer (11), wherein the ratio between the modulus of elasticity E' at 70° C. of the radially inner layer (11) and the modulus of elasticity E' at 70° C. of the radially outer layer (12) is comprised between 1.1 and 3, and the ratio between the value of tanδ at 70° C of the radially inner layer (11) and the value of tanδ at 70° C. of the radially outer layer (12) is lower than 0.8. Advantageously, the tire (1) achieves a better compromise between the characteristics of rolling resistance, handling and comfort with respect to what is obtainable from known tires for the same type of use.

14 Claims, 2 Drawing Sheets

LOW ROLLING RESISTANCE TIRE FOR VEHICLES HAVING A COMPOSITE TREAD

Applicants claim the benefit under 35 U.S.C. §119(e) based on prior-filed, copending provisional application No. 60/162,119, filed Oct. 29, 1999, in the U.S. Patent and Trademark Office.

BACKGROUND OF THE INVENTION

In a general aspect, the present invention relates to a tire for vehicles provided with a tread having a low rolling resistance.

More particularly, the present invention relates to a tire for vehicles comprising at least one belt layer coaxially extending around at least one carcass ply, a composite tread coaxially extending around the belt layer and comprising a radially outer layer adapted to get in touch with the ground and a radially inner layer interposed between the radially outer layer and the belt layer.

PRIOR ART

In the field of tire production, the main object of an increasingly greater part of research is that of obtaining an optimum compromise between, on the one hand, the tire rolling resistance—which should be reduced to the minimum—and, on the other hand, the characteristics of handling and comfort of the tire.

This object is particularly difficult to achieve when the tire is provided with a tread of the composite type, i.e. a tread comprising a radially outer layer and a radially inner layer having mechanical and hysteretic characteristics different from each other.

This particular tread structure is, in fact, particularly affected by the conflict existing between the opposite hysteretic characteristics necessary to achieve the aforementioned object. In order to reduce the rolling resistance of the tire, in fact, it is necessary to provide a radially inner layer of the tread having a low hysteresis value (which may be related to the value of tang $\delta$ at 70° C.) and, as such, suitable to dissipate a limited amount of energy during rolling: in so doing, however, handling and comfort of the tire worsen, since these characteristics may be achieved by using rubber compositions having a high hysteresis value and, as such, adapted to dissipate an amount of energy suitable to ensure a high adhesion between the tread and the ground.

In order to limit this drawback, as described for instance in U.S. Pat. No. 4,319,619, it has been proposed to use a tread of the composite type comprising a radially inner layer, obtained by vulcanizing a rubber composition including natural rubber and/or diene rubbers, having a value of tango at 40° C. not higher than 0.2 and a value of the modulus of elasticity E' not lower than 120 kg/cm .

According to what is reported in the aforementioned patent and thanks to the use of a rubber composition having a low value of tang $\delta$ and a high value of the modulus of elasticity in the radially inner layer of the tread, it is possible to reduce the rolling resistance of the tire without causing a worsening of the tire properties at high speeds or during running on a dry road.

However, the applicant has found that such a tread may give rise to a worsening of the comfort characteristics of the tire which dampens to a smaller extent the unevenness of the ground.

In order to obtain improved handling characteristics of the tires, the prior art has also proposed, as for instance described in Canadian patent CA 1 228 282, to use a composite tread comprising a radially inner layer, having a value of the modulus of elasticity E' at 25° C. comprised between 100 and 250 kg/cm$^2$, and a radially outer layer, having a value of the modulus of elasticity E' at 25° C. comprised between 70 and 150 kg/cm$^2$ and a value of tang $\delta$ not lower than 0.25, wherein the ratio between the modulus of elasticity of the radially inner layer and that of the radially outer layer (measured at 25° C.) is not lower than 1.15.

However, the Applicant has found that the tires made according to said Canadian patent, while substantially meeting the purpose, possess high hysteresis values and therefore a high rolling resistance.

SUMMARY OF THE INVENTION

The technical problem underlying the present invention is therefore that of providing a tire for vehicles provided with a tread of the composite type which would allow to obtain, with respect to the tires of the cited prior art, a better compromise between, on the one hand, the rolling resistance of the tire and, on the other hand, the characteristics Of handling and comfort thereof.

According to the invention, the aforementioned technical problem is solved by a tire for a vehicle comprising at least one carcass ply, at least one belt layer coaxially extending around the at least one carcass ply, and a composite tread coaxially extending around the at least one belt layer. The composite tread comprises a radially-outer layer adapted to contact the ground and a radially-inner layer interposed between the radially-outer layer and the at least one belt layer. A first ratio of a modulus of elasticity E' at 70° C. of the radially-inner layer to a modulus of elasticity E' at 70° C. of the radially-outer layer is greater than or equal to 1.1:1 and less than or equal to 3:1, and a second ratio of a loss tangent at 70° C. of the radially-inner layer to a loss tangent at 70° C. of the radially-outer layer is less than 0.8:1.

Surprisingly, the Applicant has found that in order to achieve the best possible compromise between rolling resistance, handling and comfort of the tire, it is not sufficient to optimize in a broad sense the hysteretic or modulus characteristics of the radially inner layer or those of the radially outer layer of the tread, but that it is necessary to provide that the values of the modulus of elasticity and tang $\delta$ of the radially inner layer of the tread with respect to the radially outer layer— measured at a specific temperature substantially equal to the running temperature of the tire in normal use conditions (70° C.)—fall within a specific range of values.

More particularly, the applicant has found that to achieve the best possible compromise between rolling resistance, handling and comfort of the tire, it is necessary that:

i) the ratio between the value of the modulus of elasticity measured at 70° C. of the radially inner layer and the corresponding value of the radially outer layer be comprised between 1.1 and 3, and that ii) the ratio between the value of tang $\delta$ at 70° C. of the radially inner layer and the corresponding value of the radially outer layer be lower than 0.8.

By respecting these ratios between the values of modulus of elasticity and tang $\delta$ at 70° C. of the two layers of the composite tread, it has been found that it is not only possible to reduce the rolling resistance of the tire, but also—and quite surprisingly—to achieve better handling and comfort performances with respect to those achieved by known tires for the same type of use.

Preferably, the ratio between the modulus of elasticity E' at 70° C. of the radially inner layer and the modulus of elasticity E' at 70° C. of the radially outer layer is comprised between 1.2 and 2.5 and, still more preferably, between 1.5 and 2.

Preferably, furthermore, the ratio between the value of tang δ at 70° C. of the radially inner layer and the value of tang δ at 70° C. of the radially outer layer of the tread is lower than 0.7 and, still more preferably, comprised between 0.2 and 0.5.

In this way it has been advantageously possible to achieve an optimum compromise between the rolling resistance of the tire and its handling and comfort performances.

Preferably, and in order to achieve the aforementioned ratios, the modulus of elasticity E' at 70° C. of the radially inner layer of the tread is comprised between 5 and 14 MPa, while the modulus of elasticity E' at 70° C. of the radially outer layer is comprised between 4 and 8 MPa.

More preferably, the modulus of elasticity E' at 70° C. of the radially inner layer is comprised between 6 and 12 MPa, still more preferably between 6.5 and 9 MPa, while the modulus of elasticity E' at 70° C. of the radially outer layer is comprised between 5 and 7 MPa.

By fulfilling the aforementioned values of the modulus of elasticity E' at 70° C. of the radially inner layer, it has been found that it is also possible to gradually improve the handling and comfort performances of the tire, while keeping low the rolling resistance of the same.

Preferably, the value of tang δ at 70° C. of the radially inner layer of the tread is lower than 0.120 and, still more preferably, it is comprised between 0.03 and 0.06.

In this way, it is possible to achieve the lowest possible rolling resistance of the tire, with all the ensuing advantages, without however adversely affecting neither the handling nor the comfort of the same tire.

Preferably, the thickness of the radially inner layer of the tread is uniform; preferably, such thickness is greater than 1 mm and, still more preferably, it is comprised between 1.5 and 2.5 mm.

On the contrary, the radially outer layer of the tread should have a thickness at least equal to, and preferably greater than, the thickness of the grooves formed therein (usually 7–8 mm in motor-cars), not to allow the radially inner layer to get in touch with the ground when the radially outer layer is worn out.

Preferably, the thickness of the radially outer layer of the tread is selected so that the ratio between the thickness of the radially inner layer (selected from the aforementioned range of values) and the overall thickness of the tread is comprised between 0.01 and 0.7, preferably between 0.015 and 0.5.

For values of such thickness ratio lower than 0.01, the effect ensuing from the high modulus of elasticity at 70° C. of the radially inner layer with respect to the modulus of the radially outer layer is not perceived and, as a consequence, the tire has lower handling characteristics. On the contrary, for values of such ratio higher than 0.7, the effect of the radially outer layer is not perceived and therefore the tire shows again lower handling characteristics.

For the purposes of the invention, the radially inner and outer layers of the tread may be obtained by forming and vulcanizing suitable rubber compositions (the composition of which is not per se critical for the purposes of the invention), adapted to achieve at 70° C. the aforementioned desired values of E' and tang δ.

Preferably, the radially inner layer of the tread is obtained by forming and vulcanizing a rubber composition comprising:

a) a cross-linkable unsaturated chain polymer base,
b) from 10 to 60 phr of at least one carbon black-based reinforcing filler,
c) an effective amount of at least one sulfur-based vulcanization agent.

In the following description and in the appended claims, the term: "phr" is used to indicate the parts by weight of a component of the rubber composition with respect to 100 parts by weight of the polymer base.

Preferably, the polymer base includes natural rubber and at least one elastomeric diolefin polymer obtainable by polymerizing, in solution or in emulsion, one or more conjugated diene monomers, possibly in admixture with an aromatic vinyl hydrocarbon, the latter being present in the polymer in an amount generally not higher that 50% by weight based on the total weight of the polymer.

Preferably, the elastomeric diene polymer contains 30 to 70% by weight of diolefin units having a 1,2 structure based on the total weight of the polymer.

For the purposes of the invention, the conjugated diene monomer of preferred use is selected from the group comprising: 1,3-butadiene, isoprene, 2,3-dimethyl-1,3-butadiene, 1,3-pentadiene, 1,3-hexadiene, and mixtures thereof, while the aromatic vinyl hydrocarbon of preferred use is selected from the group comprising: styrene, α-methyl-styrene, p-methyl-styrene, vinyl-toluene, vinyl-naphthalene, vinyl-pyridine, and mixtures thereof.

In the following description and in the appended claims, the term: diolefin unit having a 1,2-structure, is used to identify the fraction of units deriving from a 1,2-polymerization of the conjugated diene monomer. If the conjugated diene monomer is 1,3-butadiene, said diolefin units having a 1,2-structure have the following structure formula:

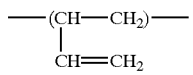

Preferably, the elastomeric diolefin polymer is selected from the group comprising styrene/1,3-butadiene copolymers (SBR), poly-1,3-butadiene (BR), styrene/isoprene copolymers and the like or mixtures thereof.

Additionally, the elastomeric diolefin polymer may be of modified type, i.e. "terminated" and/or "coupled".

The term: "terminated" copolymer, is used to indicate within the present description a copolymer obtainable by polymerizing the conjugated diolefin with a vinyl aromatic hydrocarbon in the presence of a metallorganic initiator and by subsequently reacting the intermediate copolymer so obtained with a suitable chain-terminating compound selected from the group comprising: substituted imines, an halogenated tin compound, at least one benzophenone compound having the following structural formula:

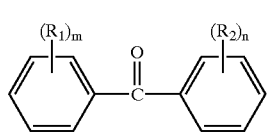

(II)

wherein $R_1$ and $R_2$ are hydrogen, halogen, an alkyl, alkenyl, alkoxy, amino, alkylamino or dialkylamino group, and m and n are an integer from 1 to 10, either alone or possibly mixed with each other.

The term: "coupled" copolymer, is used to indicate within the present description a copolymer obtainable by polymerizing the conjugated diolefin with an aromatic vinyl hydrocarbon in the presence of a metallorganic initiator and by subsequently coupling the polymer chains with a suitable chain coupling agent, comprising for instance an halogenated tin compound, with the primary aim of increasing the molecular weight of the copolymer so obtained.

In order to impart to the tread obtainable with the rubber composition of the invention adequate hysteretic characteristics, the polymer base preferably comprises 30 to 80 phr and, still more preferably, 40 to 70 phr, of natural rubber and 20 to 70 phr and, still more preferably, 30 to 60 phr of at least one elastomeric diolefin polymer as defined above.

Preferably, the rubber composition used to manufacture the radially inner layer of the tread comprises only carbon black as reinforcing filler, in an amount comprised between 10 and 60 phr and, still more preferably, between 30 and 50 phr.

The carbon black-based reinforcing fillers which may be employed in the rubber composition are those conventionally used in the art for tire treads and comprise, for instance, those indicated according to ASTM standards with the designations N110, N121, N134,N220,N231, N234, N299, N330, N339, N347, N351, N358 and N375.

For the purposes of the invention, sulfur or sulfur-containing molecules (sulfur donors) is the vulcanization agent of more advantageous use, with accelerators and activators well known to those skilled in the art.

Preferably, the amount of vulcanization agent based on sulfur or sulfur donors is comprised between 1 and 4.5 phr, still more preferably between 2 and 4.1 phr.

Preferably, the rubber composition of the radially inner layer of the tread further includes an effective amount of a suitable component adapted to increase the value of the modulus of elasticity at 70° C. of the vulcanized rubber composition, without substantially increasing at the same time the value of tang δ.

For the purposes of the invention, such component may be selected from the group comprising one or more thermosetting resins, reinforcing fibers, for instance short fibrillated fibers of a suitable material, such as, for instance, glass, carbon, cellulose, polyvinyl alcohol, polyamide or polyester, or mixtures thereof.

For the purposes of the invention, the aforementioned thermosetting resin is preferably selected from the group comprising: resorcinol/methylene-donor compounds resins, epoxy resins, alkyd resins, and mixtures thereof.

Methylene donor compounds of preferred use are those selected from the group comprising donors of the amine type, such as for instance hexamethoxy methylmelamine (HMMM), hexamethylene tetramine (HMT), and mixtures thereof.

Epoxy resins of preferred use are those selected from the group comprising the resins of the epoxy/polyol, epoxy/diamine or epoxy/dicarboxy type.

Advantageously, such thermosetting resin contributes to further increase the modulus of elasticity at 70° C. of the radially inner layer of the tread, allowing to use quantities of sulfur which are not prone to induce undesired reversion phenomena of the rubber composition.

Essentially, these phenomena consist in a partial breaking and/or cyclization of the sulfur-based cross links between the polymer chains of the rubber composition which may be substantially attributed to the high temperatures which are reached during the vulcanization operations and/or the use of the tire. This generally turns out in a reduction of the value of the modulus of elasticity E' at 70° C. of the layer and therefore in a worsening of the handling of the tire.

For the purposes of the invention, the thermosetting resin is present in the rubber composition in a quantity adapted to achieve the desired values of the modulus of elasticity E' at 70° C., depending on the number of cross-linking groups present in the starting resin and/or on the nature of the same (either a two-component resin or a precondensed resin).

Preferably, the amount of thermosetting resin is comprised between 0.5 and 15 phr, more preferably between 2 and 10 phr and, still more preferably, between 3 and 7 phr.

The aforementioned reinforcing fibers preferably comprise the so-called aramid pulp (short fibrillated fibers of poly-paraphenylene-terephtalamide), of the type commercially known as "Kevlar®-pulp" or "Twaron®-pulp" (Kevlar and Twaron are registered trademarks of DuPont and, respectively, of Akzo), described in U.S. Pat. No. 4,871,004, the description of which is herein incorporated by reference.

For the purposes of the invention, the aforementioned reinforcing fibers may be employed either as such or in the form of a predispersion in a suitable polymer matrix having the function of a carrier, for instance constituted by natural rubber, butadiene-styrene copolymers, ethylene-vinyl acetate copolymers or the like.

For the purposes of the invention, said reinforcing fibers are present in the rubber composition in a quantity adapted to achieve the desired values of the modulus of elasticity E' at 70° C. according to the chemical nature of the fiber, to the length/diameter ratio of the same and to the type of polymer base employed.

Preferably, the amount of reinforcing fibers (excluding the possible polymer carrier) is comprised between 1 and 6 phr and, still more preferably, between 1 and 4 phr.

In order to improve the handling characteristics of the tire, it is also preferable and advantageous to employ, in addition to the ingredients described hereinabove, 0.5 to 3 phr, more preferably 1 to 2.5 phr and, still more preferably, 1 to 2 phr, of at least one anti-reversion agent.

Advantageously, the additional presence of such anti-reversion agent contributes to improve the handling characteristics of the tire and to keep the same with time, reducing to a minimum said reversion phenomena of the rubber composition both during its vulcanization and during the use of the tire.

Anti-reversion agents of preferred use are those selected from the group comprising aromatic imide compounds, such as for instance 1,3-bis(citraconimidomethyl)benzene, commercially available under the trade name of Perkalink® 900 (Flexys, The Netherlands).

Additional or alternative anti-reversion agents may be selected from sulfur-containing agents adapted to stabilize the vulcanization lattice, such as for instance those selected from the group comprising: sulfur-containing silane compounds, dithiodimorpholine, dithiocaprolactame disulfide, and mixtures thereof.

In a preferred embodiment, the sulfur-containing stabilizing agent is a sulfur-containing silane compound having the following structural formula:

$$(R)_3\text{—Si—}C_nH_{2n}X \qquad (I)$$

wherein:

R is an alkyl or an alkoxy group comprising 1 to 4 carbon atoms or a chlorine atom, n is an integer comprised between 1 and 6, and X is a mercapto group or a $S_mY$ group, wherein Y is $(R)_3$—Si—$C_nH_{2n}$—, wherein R and n are as defined above, or a group selected from the following functional groups

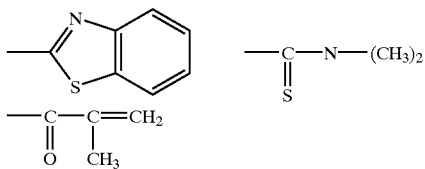

wherein m is an integer comprised between 1 and 6, and preferably is equal to 4, and R is an alkyl or an alkoxy group comprising 1 to 5 carbon atoms or a chlorine atom.

Still more preferably, the sulfur-containing silane compound is the silane-based coupling agent Si69 [bis(3-triethoxysilyl-propyl)tetrasulfide] (DEGUSSA) or the silane-based coupling agent [bis(3-triethoxysilyl-propyl) disulfide] (DEGUSSA) as such or in a suitable mixture with an inert filler (for instance carbon black), in order to facilitate its incorporation into the rubber composition, or the commercial products known under the trade names of X50S and X-75S (DEGUSSA) (50% carbon black, 50% silane).

In addition to the aforementioned ingredients, the rubber composition of the radially inner layer of the tread may incorporate one or more non cross-linking ingredients, known per se, necessary to impart the necessary mechanical and workability characteristics to the rubber composition.

Such ingredients are selected in particular from the group comprising plasticizers, working adjuvants, antioxidants, anti-aging agents, etc.

Each of such ingredients, furthermore, is selected in amounts and ratios which may be easily determined by a man skilled in the art.

For the purposes of the invention, the rubber composition employed to produce the radially outer layer of the tread may be constituted by conventional ingredients known in the art and including a silica-based reinforcing filler, such as those described in European patent application EP 0 728 803, the description of which is herein incorporated by reference.

Preferably, and in order to reduce to a minimum the rolling resistance of the tire, the vulcanized rubber composition employed to manufacture the radially outer layer of the tread comprises:

a) at least a first cross-linkable unsaturated chain polymer;
b) a first carbon black-based reinforcing filler;
c) at least a second cross-linkable unsaturated chain polymer;
d) a second silica-based reinforcing filler;
e) a suitable silica-coupling agent;
f) a sulfur-based vulcanization agent.

Preferably, the first cross-linkable unsaturated chain polymer is a modified copolymer obtainable by polymerizing at least one conjugated olefin with at least one aromatic vinyl hydrocarbon in the presence of an initiator comprising at least one metallorganic group and by subsequently reacting the intermediate copolymer so obtained with a compound comprising functional groups reactive with respect to metallorganic groups present on the copolymer and deriving from the initiator, said modified copolymer having a glass transition temperature comprised between 0° and −80° C., and comprising a total amount of aromatic vinyl hydrocarbon comprised between 5% and 50% by weight based on the total weight of the same.

Preferably, the second cross-linkable unsaturated chain polymer is, instead, a copolymer obtainable by polymerizing at least one conjugated olefin with at least one aromatic vinyl hydrocarbon, said second polymer having a glass transition temperature comprised between 0° and −80° C., and comprising a total amount of aromatic vinyl hydrocarbon comprised between 5% and 50% by weight based on the total weight of the same.

Such copolymers and the first carbon black-based reinforcing filler may be, for instance, those described above and constituting part of the rubber composition of the radially inner layer of the tread.

Preferably, the second silica-based reinforcing filler has a BET surface area comprised between 100 and 300 m²/g, a surface area measured by CTAB absorption according to ISO 6810 comprised between 100 and 300 m²/g, a DBP absorption value measured according to ISO 4656-1 comprised between 150 and 250 ml/100 g.

Coupling agents of preferred use are silane-based and correspond to the stabilizing agents of the vulcanization lattice of formula (I) described hereinabove.

According to a further aspect of the invention, a composite tread for vehicle tires is provided, in particular a pre-molded tread for covering worn tires having a good handling on wet roads and a low rolling resistance, comprising a radially-inner layer and a radially-outer layer wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and a second ratio of a loss tangent at 70° C. of the radially-inner layer to a loss tangent at 70° C. of the radially-outer layer is less than 0.8:1.

According to a further aspect of the invention, a process is provided for manufacturing a tire for vehicle wheels, comprising the steps of providing at least one belt layer, circumferentially providing a tread comprising a radially-inner layer and a radially-outer layer around the at least one belt layer, and associating the tread to the at least one belt layer by vulcanization, wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and a second ratio of a loss tangent at 70° C. of the radially-inner layer to a loss tangent at 70° C. of the radially-outer layer is less than 0.8:1.

According to a further aspect of the invention, a process is provided for covering a worn tire for a vehicle wheel, the worn tire having at least one belt layer, comprising the steps of: circumferentially providing a tread comprising a radially-inner layer and a radially-outer layer around the at least one belt layer of the worn tire, and irreversibly associating the tread to the at least one belt layer, wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and a second ratio of a loss tangent at 70° C. of the radially-inner layer to a loss tangent at 70° C. of the radially-outer layer is less than 0.8:1

Lastly, according to a further aspect of the invention, a method is provided for reducing the rolling resistance and thereby increasing the wear resistance of a tire, comprising: providing the tire with at least one carcass ply, extending at least one belt layer coaxially around the at least one carcass ply, and extending a composite tread coaxially around the at least one belt layer, the composite tread comprising a radially-outer layer adapted to contact the ground and a radially-inner layer interposed between the radially-outer layer and the at least one belt layer, wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and a second ratio of a loss tangent at 70° C. of the radially-inner layer to a loss tangent at 70° C. of the radially-outer layer is less than 0.8:1.

BRIEF DESCRIPTION OF THE DRAWINGS

Additional features and advantages of the invention will be better apparent by the following description of some examples illustrating the manufacture of a tire according to the invention and of the related rubber compositions, which description is made by way of non limiting indication, with reference to the attached drawings, wherein.

DETAILED DESCRIPTION OF THE PREFERRED EMBODIMENTS

Figure 1:
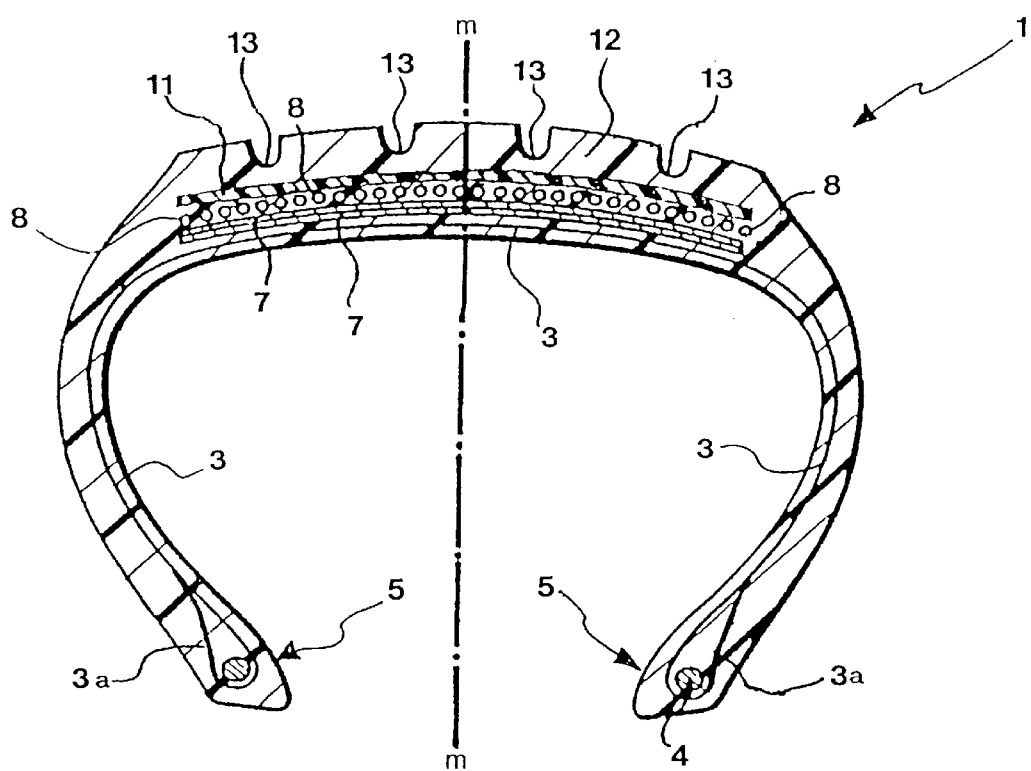
FIG. 1 is a partly interrupted cross-section view of a tire according to the invention.

With reference to said figures, a tire manufactured according to the invention is generally indicated at 1.

Such tire comprises a carcass ply 3 whose opposite side edges are externally bent around respective anchoring bead wires 4, each incorporated in a bead 5 defined along an inner circumferential edge of the tire, at which the tire engages a rim (not shown) making part of a vehicle wheel. Each anchoring bead wire 4 of the beads 5 may be made according to any method known in the art, for instance it may be made of metal wires or strings.

Along the circumferential development of the carcass ply 3, one or more belt layers 7 are applied, conventionally made of a fabric of metal wires or strings embedded in a rubber sheet, said metal wires or strings being arranged parallel to each other in each layer and crossed with those of the adjoining layer.

Above said belt layers 7 a so-called 0° layer is provided, wherein a string 8, for instance made of nylon, is coil-wound coaxially to the tire 1; the winding angle of the string 8 is, as usual, small with respect to an equatorial plane m—m of said tire. Conventionally, the string 8 is embedded in a rubber layer, for instance in such a manner as to form one or more "bands" or other similar solutions known in the art.

The tire 1 is also provided with a tread 10, crown-applied around the 0° layer; more specifically, said tread is of the composite or "cap and base" type and comprises a radially inner layer or base layer 11 and a radially outer layer 12, adapted to get in touch with the ground, provided with a tread pattern comprising recesses and grooves 13 which delimit a plurality of ribs and blocks.

As shown in the figures, the base layer 11 of the tread 10 has, in this case, a uniform thickness; preferably, such thickness is greater than 1 mm, and still more preferably, it is comprised between 1.5 and 2 mm.

Figure 2:
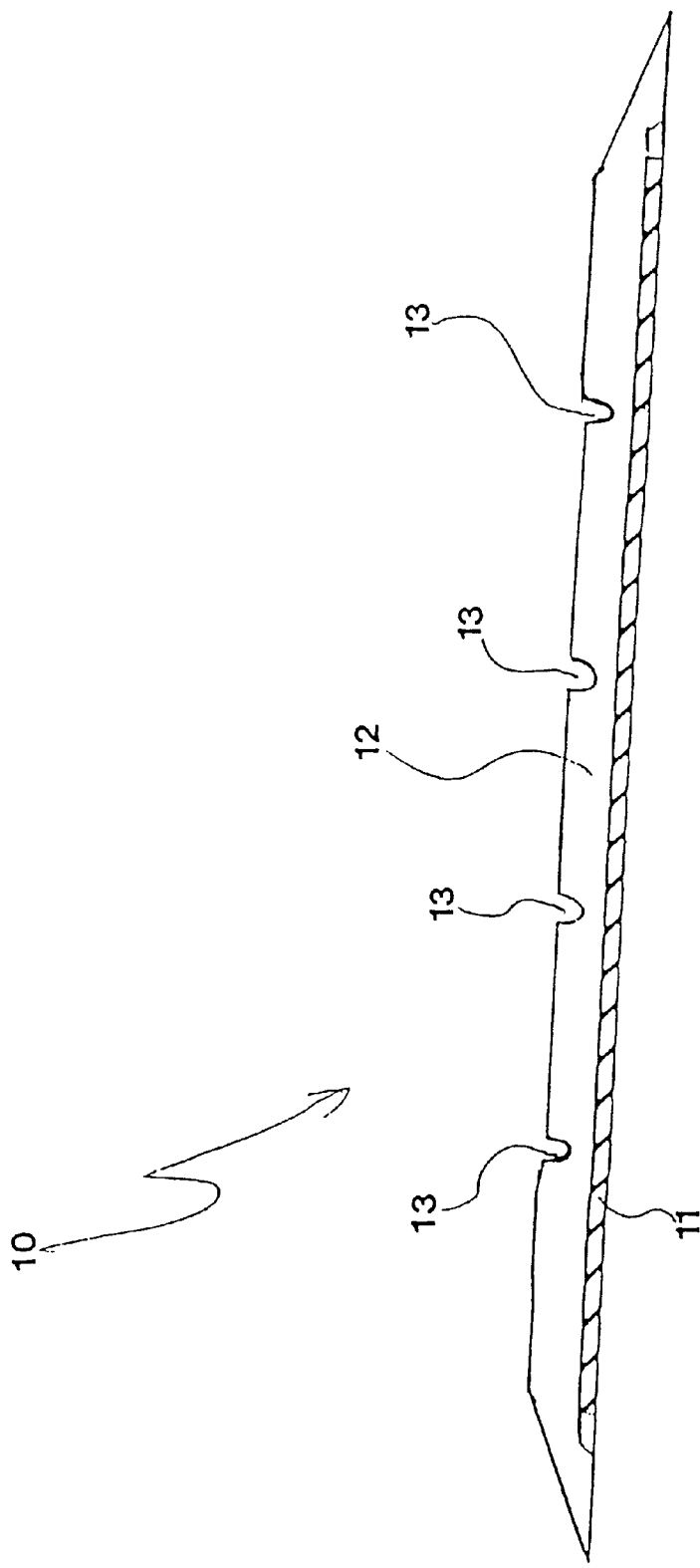
FIG. 2 is an enlarged scale cross-section view of some details of the tire tread of FIG. 1.

In any case, the thickness of the base layer 11 may also be non uniform but, for instance, greater near its outer edges (with reference to the cross sections of FIGS. 1 and 2) and/or at the central zone thereof.

On the contrary, the radially outer layer 12 of the tread 10 should have a thickness at least equal to, and preferably greater than, the thickness of the grooves 13, so as not to allow the base layer 11 to get in touch with the ground when the radially outer layer 12 is worn out.

The tire 1 described above may be manufactured by means of a process comprising a plurality of manufacturing steps conventional per se and known in the art.

More particularly, such process comprises the steps of preliminarly and separately preparing a series of semifinished products corresponding to the different parts of the tire (carcass plies, belt layers, wire beads, bead, fillings, sidewalls and treads), which are then assembled with each other with a special assembling machine.

Afterwards, the subsequent vulcanization step joins said semifinished products with each other to obtain an integral block, namely the tire.

Obviously, the preparation of the aforementioned semifinished products is preceded by a preparation and forming step of the corresponding rubber compositions.

In the tires of the invention, the tread 10 of the composite type is produced by assembling during the vulcanization step two semifinished products obtained by forming respective rubber compositions of the type described above, said semifinished products being intended to form said radially inner and outer layers of the tread 10.

Alternatively, the two layers of the tread 10 may be produced by means of coextrusion according to conventional techniques.

The reconstruction or covering of a worn out tire may also be carried out, in a manner known per se, according to two different methods known with the terms of heat-covering and cold-covering.

In both cases, the worn out tire is prepared by removing the tread down to the outermost belt layer on which a sheet of a suitable rubber composition is applied.

In heat-covering, the tread consists of a green rubber composition which associated to the outermost belt layer in a suitably conformed vulcanization mold, which has also the function of creating the desired tread pattern.

In cold-covering, the tread consists of an already vulcanized rubber composition which already possesses the tread pattern and which is irreversibly associated in an autoclave to the outermost belt layer.

In the following examples, given by way of illustration and not of limitation, some formulations of rubber compositions suitable for the manufacture of treads and tires according to the invention, as well as some comparative tests to which some tires of the present invention and comparative tires have been subjected, will be described.

EXAMPLE 1

(Invention)

A. Preparation of the Radially Outer Layer of the Tread

A rubber composition having the composition reported in the following Table I (parts expressed in phr) was obtained by means of two mixing steps carried out with a rotor mixer known per se (Banbury) using a 70% filling factor. In the first step, all the ingredients, except the vulcanization system, were charged in the rotor mixer and mixed at about 40 rpm for 4 minutes.

During mixing, the mechanical work imparted to the mixture was controlled so as to keep the temperature of the mixture at about 150°–155° C.

During the second step, carried out after having cooled the rubber composition thus obtained down to 23° C., the vulcanization system was mixed with the other ingredients in the rotor mixer at 20 rpm for 4 minutes, taking care to keep the temperature of the mixture at a value equal to about 100° C., to prevent a premature start of vulcanization.

The following ingredients were employed:

S-SBR-A=terminated and coupled butadiene-styrene copolymer, prepared in solution, having a 1,2-structure content equal to 57% by weight and a styrene content equal to 21% by weight, available on the market under the trade name of NS 116™ (Nippon Zeon);

S-SBR-B=butadiene-styrene copolymer available on the market under the trade name BUNA VSL™ 5025-1 (Bayer);

polybutadiene high-cis 1,3 polybutadiene available on the market under the trade name EUROPRENE™ NEOCIS (Enichem);

$SiO_2$=BET 175 $m^2$/g, VN3 type (Degussa);

carbon black=Vulcan 1380™ (Cabot Corporation);

X50S=silane compound including 50% carbon black, 50% bis(3-triethoxysilylpropyl)tetrasulfide (Degussa);

antioxidant=6PPD, also known as SANTOFLEX™ 13 (Monsanto);

plasticizers=aromatic oils and waxes conventional per se;

stearic acid;

ZnO;

accelerators=diphenylguanidine DPG (Monsanto) and SANTOCURE™ NS (Monsanto);

sulfur.

B. Preparation of the Radially Inner Layer of the Tread

A rubber composition having the composition reported in the following Table I was obtained according to the procedure described above with reference to the preparation of the rubber composition of the radially outer layer.

Among the ingredients employed, also the following additional ingredients were used in addition to those already described with reference to the rubber composition of the radially outer layer:

NR=natural rubber;

Perkalink® 900=1,3-bis(citraconimidomethyl)benzene;

HMT=hexamethylene tetramine;

resorcinol.

In the following Examples 2-6, additional rubber compositions employed for the production of the radially inner layer of the tread of the invention will be now described.

EXAMPLE 2

Invention

A rubber composition having the composition shown in the following Table I was obtained according to the procedure described in preceding Example 1.

Among the ingredients employed, also the following additional ingredients were used in addition to those already described with reference to the rubber composition of the radially inner layer of Example 1:

Kevlar®-pulp=short fibrillated aramid fibers dispersed in a polymeric matrix of natural rubber (fiber percentage=23% by weight).

EXAMPLES 3–6

Comparison

Four comparative rubber compositions were prepared according to the procedure already described in preceding Example 1.

Among the ingredients employed, also the following additional ingredients were used in addition to those already described with reference to the rubber composition of the radially inner layer of Example 1:

E-SBR 1712=emulsion-prepared butadiene-styrene copolymer, available on the market under the trade name of EUROPRENE™ 1712 (Enichem).

The composition of such rubber compositions is reported in the following Table 1.

EXAMPLES 7–8

Comparison

According to the preparation methods described in U.S. Pat. 4,319,619, two rubber compositions were prepared for the radially inner layer of the tread according to Examples 1 and, respectively, 3 of said patent.

Among the ingredients employed, also the following additional ingredients were used in addition to those already described with reference to the rubber composition of the radially inner layer of Example 1:

E-SBR 1500=emulsion-prepared butadiene-styrene copolymer, available on the market under the trade name of EUROPRENE™1500 (Enichem).

The composition of the so obtained rubber compositions is reported in the following Table II.

EXAMPLE 9

Comparison

According to the preparation methods described in Canadian patent CA 1 228 282, a rubber composition was prepared for the radially inner layer of the tread according to Example Z of such patent.

The composition of the rubber composition so obtained is reported in the following Table II.

EXAMPLE 10

Determination of the Dynamic Properties of the Rubber Composition

A sample of each of the rubber compositions according to the preceding Examples 1–2 (invention), 3–9 (comparison) was submitted to vulcanization for 30' at 151° C. with techniques and apparatuses known per se, and thereafter to several tests in order to evaluate the dynamic properties thereof.

More particularly, the values of tang δ were determined according to the experimental method described in the following and using apparatuses of the company INSTRON available on the market.

The values of the modulus of elasticity E', of the loss modulus E" and of tang δ were determined by submitting a cylindrical test piece of vulcanized rubber composition having a length of 25 mm and a diameter of 14 mm, subjected to compression preloading up to a longitudinal deformation of 25% of its original height and kept at prefixed temperature (23° or 70° C.), to a dynamic sinusoidal deformation of a maximum width of ±3.50% of the height under preloading, with a frequency of 100 cycles per second (100 Hz).

For the purposes of the present example, it is intended that all the mentioned values of E', E" and of tang δ have been determined and should be determined according to the method described hereinabove.

Furthermore, in the determination of the values of E' and E", an experimental error equal to ±0.5 MPa has been assumed and correspondingly an error of ±0.1 in the values of the ratio between the modulus of elasticity E' of the radially inner layer and that of the radially outer layer. Taking into account such an error, the values of the ratio between the modulus of elasticity E' at 70° C. of the radially inner and outer tread layers which are lower than 1.1 are considered as being outside the range claimed herein.

The results of the tests carried out are reported in the following Tables III and IV, in which are shown the mean values measured on 3 tests of the modulus of elasticity E' (MPa) and of tang δ (dimensionless) at the temperatures of 23° and 70° C. for the rubber compositions employed to produce the radially outer layer (which is the same for all the examples) and for the rubber compositions employed to produce the radially inner layers according to the invention (Examples 1–2) and, respectively, the comparative layers (Examples 3–9).

Tables III and IV also show the values of the ratio between the modulus of elasticity and tang δ measured at 70° C. of the various radially inner layers and the modulus of elasticity and tang δ measured at 70° C. of the radially outer layer.

Taking into account that—based on the tests carried out—the rolling resistance is the lower the lower is the value of tang δ measured at 70° C. of the radially inner layer, it is easy to note from the data reported in Tables III and IV that the rolling resistance performances of the rubber compositions according to the invention (Examples 1–2) are better than those achieved by the comparative rubber compositions (Examples 2–6) and comparable to, or better than, those of the rubber compositions of the prior art (Examples 7–9).

EXAMPLE 11

Handling

Using the rubber compositions according to the preceding Examples 1–2 (invention) and 3–9 (comparison), several treads were produced by drawing in apparatuses known per se, which treads were then employed to manufacture tires of size 175/65 R14.

In particular, the following sets of tires were produced:
reference tires, comprising a tread of the non composite type obtained from a rubber composition used to produce the radially outer layer of Example 1 (part A);
test tires comprising a tread of the composite type wherein:
  i) the radially outer layer was obtained from the rubber composition of Example 1, part A, and
  ii) the radially inner layer was obtained from the rubber composition of Example 1, part B (invention) and from the rubber compositions of Examples 2 (invention) and 3–6 (comparison).

The tires thus obtained were then submitted to standard tests in order to evaluate the rolling resistance and the performances of the same in terms of handling and comfort.

A. Evaluation of Rolling Resistance

This evaluation was carried out on each tire according to standards ISO 8767 and in particular to the so-called "Torque Method", reported under point 7.2.2. of the same, using conventional laboratory apparatuses.

The measurements were made at a constant speed of 80 km/h, while parasitic losses were measured according to the "Skim Reading" method reported under point 6.6.1. of the aforesaid standards ISO 8767.

In order to compare the performances of the tires of the invention with those of comparative tires, the power loss in kg/t measured in the case of reference tires was attributed a rolling resistance index of 100.

A % increase of the index was then attributed to the test tires the lower was the power loss found during the test. In other words, the higher the value of the index, the lower the rolling resistance of the tire under test.

The results of the tests carried out are reported in the following Table V (RR Index).

B. Evaluation of the Performances in Terms of Handling and Comfort

This evaluation was carried out at the test track of Vizzola, mounting the tires on cars model Bravo having a displacement of 1600 cm³.

The reference and test tires were tested by two independent test drivers who attributed to the tires a feeling-rate of 0 to 10 for handling and comfort.

Also in this case, a handling and comfort index of 100 was attributed to the global judgment expressed for the reference tires.

A % increase of the index was then attributed to the test tires the better were the handling and comfort performances found during the test. In other words, the higher the value of the index, the better were the performances of the tire under test.

The results of the tests carried out are shown in the following Table V.

EXAMPLE 12

Determination of Reversion

A sample of each of the rubber compositions according to the preceding Examples 1–2 (invention), 3–9 (comparison) was submitted to a rheometric analysis MDR (Moving Die Rheometer) according to the standards ASTM D5289-95, using a rheometer model Monsanto MDR and carrying out the tests at 151° C. for 30 minutes, with an oscillation frequency of 1.66 Hz (equal to 100 oscillations/minute) and an oscillation amplitude of ±0.5°.

The reversion level was determined from the rheometric curves thus obtained, according to the following formula:

$$\% \ reversion = \frac{M_H - M_{fin}}{M_H - M_L} * 100$$

wherein:
$M_H$=maximum torque value
$M_{fin}$=final torque value
$M_L$=minimum torque value The results of such tests are reported in Tables III and IV for the examples of the invention (1–2) and, respectively, for the comparative examples (3 9).

An overall examination of the data reported in Tables III, IV and V shows that the tires of the invention achieve a better compromise between rolling resistance on the one hand and, on the other hand, the performances in terms of handling and comfort with respect to both the comparative rubber compositions and those of the prior art.

As to the tires provided with treads obtained from the rubber compositions of Examples 3 and 5 (comparison) and having a ratio between the modulus of elasticity E' at 70° C. of the two radially inner and outer layers falling outside of the range indicated hereinabove (1.1–3), the Applicant has found, in particular, a worse performance in terms of rolling resistance and/or comfort with respect to those achieved by the tires of the invention (Examples 1–2).

As to the tires provided with treads obtained from the rubber compositions of Examples 4 and 6 (comparison) and having a ratio between the values of tang δ at 70° C. of the two radially inner and outer layers higher than the limit value indicated hereinabove (0.8), the Applicant has found, in particular, a worse performance in terms of rolling resistance, comfort and/or handling with respect to those achieved by the tires of the invention (Examples 1–2).

As to the tires obtainable from the rubber compositions of comparative Examples 7–8 (prior art) and having a ratio between the values of the modulus of elasticity E' at 70° C. of the two radially inner and outer layers falling outside of the range indicated hereinabove (1.1–3), a worse performance at least in terms of comfort (Examples 7–8) may be expected with respect to that achieved by the tires of the invention (Examples 1–2).

As to the tires obtainable from the rubber composition of comparative Example 9 prior art) and having a ratio between the values of tang δ at 70° C. of the two radially inner and outer layers higher than the limit indicated hereinabove (0.8), a worse performance both in terms of comfort and rolling resistance may be expected with respect to that achieved by the tires of the invention (Examples 1–2).

The examination of the data reported in Tables III and IV regarding the resistance of the rubber compositions to the reversion phenomena shows that the rubber compositions of comparative Examples 3 and 4, and above all those of Examples 7–9 related to the prior art, have reversion values higher than those found with the rubber compositions of the invention (Examples 1–2) with an ensuing worsening of performance in terms of handling.

TABLE I

| Ingredients | bts | Ex. 1 | Ex. 2 | Ex. 3* | Ex. 4* |
|---|---|---|---|---|---|
| S-SBR-A | 25 | 30 | — | — | — |
| S-SBR-B | 50 | — | — | — | — |
| E-SBR 1712 | — | — | — | — | 50 |
| NR | — | 40 | 63 | 100 | 50 |
| polybutadiene | 25 | 30 | 30 | — | — |
| Kevlar ®-pulp | — | — | 9 | — | — |
| silica | 30 | — | — | — | — |
| carbon black | 30 | 30 | 50 | 45 | 60 |
| X50S | 2.4 | 2 | 2 | — | — |
| antioxidant | 2.5 | 2 | 2.5 | 1 | 2 |
| ZnO | 2 | 3 | 2.5 | 3.5 | 3.5 |
| Stearic acid | 2 | 2 | 2 | 2 | 2 |
| plasticizers | 8 | 1.5 | 5 | — | 4 |
| Perkalink ® 900 | — | 1.5 | — | — | — |
| HMT | — | 2 | — | — | — |
| resorcinol | — | 2 | — | — | — |
| accelerators | 2.5 | 1.2 | 1.6 | 1.2 | 1.2 |
| sulfur | 1.5 | 4.02 | 2.2 | 1.5 | 1.5 | bts = rubber composition of the radially outer layer
* = comparison

TABLE II

| Ingredients | Ex. 5* | Ex. 6* | Ex. 7* | Ex. 8* | Ex. 9* |
|---|---|---|---|---|---|
| S-SBR-A | 50 | — | — | — | — |
| S-SBR-B | — | — | — | — | — |
| E-SBR 1712 | — | 100 | — | — | 100 |
| E-SBR 1500 | — | — | — | 30 | — |
| NR | 50 | — | 100 | 55 | — |
| polybutadiene | — | — | — | 15 | — |
| carbon black | 50 | 75 | 50 | 60 | 90 |
| antioxidant | 2 | 2 | 1 | 1 | 1 |
| ZnO | 2.5 | 3.5 | 5 | 5 | 3 |
| Stearic acid | 2 | 2 | 3 | 2 | 1 |
| plasticizers | — | — | 5 | 5 | 35 |
| accelerators | 1.2 | 1.5 | 1.7 | 1.5 | 1.8 |
| sulfur | 2 | 1.5 | 2.8 | 2.8 | 1.7 |

* = comparison

TABLE III

| Properties | bts | Ex. 1 | Ex. 2 | Ex. 3* | Ex. 4* |
|---|---|---|---|---|---|
| % reversion | 0 | 2 | 5 | 25 | 12 |
| E'23° C. [MPa] | 9.6 | 8.6 | 12.5 | 4.8 | 9 |
| E'70° C. [MPa] | 6.1 | 7.4 | 9.3 | 3.8 | 6.5 |
| tangδ 23° C. | 0.329 | 0.054 | 0.097 | 0.146 | 0.303 |
| tangδ 70° C. | 0.17 | 0.043 | 0.06 | 0.106 | 0.154 |

TABLE III-continued

| Properties | bts | Ex. 1 | Ex. 2 | Ex. 3* | Ex. 4* |
|---|---|---|---|---|---|
| E'$_{sts}$/E'$_{bts}$ 70° C. | 1 | 1.21 | 1.53 | 0.63 | 1.07 |
| tangδ$_{sts}$/tangδ$_{bts}$ 70° C. | 1 | 0.25 | 0.35 | 0.62 | 0.91 | bts = rubber composition of the radially outer layer
* = comparison
E'$_{sts}$ = modulus of elasticity of the radially inner layer
E'$_{bts}$ = modulus of elasticity of the radially outer layer
tangδ$_{sts}$ = tangδ of the radially inner layer
tangδ$_{bts}$ = tangδ of the radially outer layer

TABLE IV

| Properties | Ex. 5* | Ex 6* | Ex. 7* | Ex. 8* | Ex. 9* |
|---|---|---|---|---|---|
| % reversion | 0 | 0 | 25 | 10 | 2 |
| E'23° C. [MPa] | 8.3 | 14 | 5.32 | 7.23 | 11.42 |
| E'70° C. [MPa] | 5 | 8 | 4.65 | 6.33 | 7.16 |
| tangδ 23° C. | 0.283 | 0.354 | 0.044 | 0.060 | 0.195 |
| tangδ 70° C. | 0.126 | 0.234 | 0.028 | 0.049 | 0.188 |
| E'$_{sts}$/E'$_{bts}$ 70° C. | 0.82 | 1.31 | 0.76 | 1.04 | 1.17 |
| tangδ$_{sts}$/tangδ$_{bts}$ 70° C. | 0.74 | 1.38 | 0.16 | 0.29 | 1.11 | bts = rubber composition of the radially outer layer
* = comparison
E'$_{sts}$ = modulus of elasticity of the radially inner layer
E'$_{bts}$ = modulus of elasticity of the radially outer layer
tangδ$_{sts}$ = tangδ of the radially inner layer
tangδ$_{bts}$ = tangδ of the radially outer layer

TABLE V

| Example | RR Index | Handling Index | Comfort Index |
|---|---|---|---|
| reference | 100 | 100 | 100 |
| Ex. 1 | 108 | 120 | 110 |
| Ex. 2 | 105 | 125 | 105 |
| Ex. 3* | 92 | 110 | 104 |
| Ex. 4* | 95 | 104 | 97 |
| Ex. 5* | 90 | 112 | 95 |
| Ex. 6* | 90 | 96 | 85 |

* = comparison

What is claim is:
1. A tire for a vehicle, comprising:
at least one carcass ply;
at least one belt layer coaxially extending around the at least one carcass ply; and
a composite tread coaxially extending around the at least one belt layer;
wherein the composite tread comprises a radially-outer layer adapted to contact the ground and a radially-inner layer interposed between the radially-outer layer and the at least one belt layer,
wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and
wherein a second ratio of a loss tangent at 70° C. of the radially-inner layer to a loss tangent at 70° C. of the radially-outer layer is less than 0.8:1.

2. The tire of claims 1, wherein the first ratio is greater than or equal to 1.2:1 and less than or equal to 2.5:1, and wherein the second ratio is less than 0.7:1.

3. The tire of claim 1, wherein the modulus of elasticity at 70° C. of the radially-inner layer is greater than or equal to 5 MPa and less than or equal to 14 MPa.

4. The tire of claim 1, wherein the loss tangent at 70° C. of the radially-inner layer is less than 0.12.

5. The tire of claim 1, wherein a third ratio of a thickness of the radially-inner layer to an overall thickness of the tread is greater than or equal to 0.01:1 and less than or equal to 0.7:1.

6. The tire of claim 1, wherein the radially-inner layer comprises a formed and vulcanized rubber composition comprising an amount of a component effective to increase a modulus of elasticity E' of the radially-inner layer.

7. The tire of claim 6, wherein the component comprises at least one thermosetting resin.

8. The tire of claim 6, wherein the component comprises at least one reinforcing fiber.

9. The tire of claim 6, wherein the component comprises a mixture of at least one thermosetting resin and at least one reinforcing fiber.

10. The tire of claim 1, wherein the radially-inner layer comprises a formed and vulcanized rubber composition comprising from 0.5 phr to 3 phr of at least one anti-reversion agent.

11. A tread for a vehicle tire, comprising:

a radially-inner layer; and a radially-outer layer;

wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and wherein a second ratio of a loss tangent at 70° C. of the radially-inner layer to a loss tangent at 70° C. of the radially-outer layer is less than 0.8:1.

12. A process for manufacturing a tire for a vehicle wheel, comprising the steps of:

providing at least one belt layer;

circumferentially providing a tread around the at least one belt layer; and associating the tread to the at least one belt layer by vulcanization;

wherein the tread comprises a radially-inner layer, wherein the tread comprises a radially-outer layer, wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and wherein a second ratio of a loss tangent at 70° C. of the radially-inner layer to a loss tangent at 70° C. of the radially-outer layer is less than 0.8:1.

13. A process for covering a worn tire for a vehicle wheel the worn tire having at least one belt layer, comprising the steps of:

circumferentially providing a tread around the at least one belt layer of the worn tire; and irreversibly associating the tread to the at least one belt layer;

wherein the tread comprises a radially-inner layer;

wherein the tread comprises a radially-outer layer;

wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and wherein a second ratio of a loss tangent at 70° C. of the radially-inner layer to a loss tangent at 70° C. of the radially-outer layer is less than 0.8:1.

14. A method for increasing wear resistance of a tire, comprising:

providing the tire with at least one carcass ply;

extending at least one belt layer coaxially around the at least one carcass ply; and extending a composite tread coaxially around the at least one belt layer;

wherein the tread comprises a radially-outer layer adapted to contact the ground, wherein the tread comprises a radially-inner layer interposed between the radially-outer layer and the at least one belt layer, wherein a first ratio of a modulus of elasticity E' at 70° C. of the radially-inner layer to a modulus of elasticity E' at 70° C. of the radially-outer layer is greater than or equal to 1.1:1 and less than or equal to 3:1, and wherein a second ratio of a loss tangent at 70° C. of the radially-inner layer to a loss tangent at 70° C. of the radially-outer layer is less than 0.8:1.

* * * * *

UNITED STATES PATENT AND TRADEMARK OFFICE
CERTIFICATE OF CORRECTION

PATENT NO. : 6,516,847 B1  
DATED : February 11, 2003  
INVENTOR(S) : Amaddeo et al.

Page 1 of 1

It is certified that error appears in the above-identified patent and that said Letters Patent is hereby corrected as shown below:

<u>Title page,</u>  
Item [57], ABSTRACT,  
Lines 7 and 8, "E'" should read -- $E'$ --.

<u>Column 16,</u>  
Line 53, "E'" should read -- $E'$ --.  
Line 60, "claims 1" should read -- claim 1 --.  
Line 63, after "elasticity", insert -- $E'$ --.

<u>Column 18,</u>  
Line 4, "wheel" should read -- wheel, --.

Signed and Sealed this

Twenty-first Day of October, 2003

JAMES E. ROGAN  
*Director of the United States Patent and Trademark Office*